Figure 6:
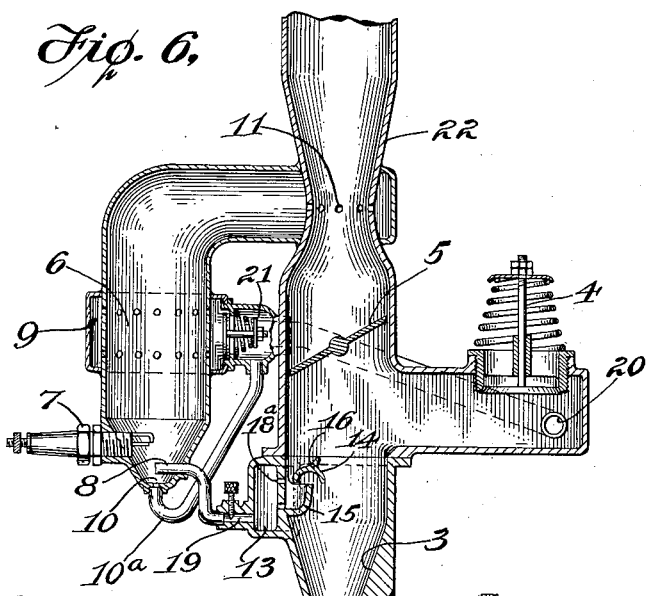

Jan. 20, 1931.  J. GOOD  1,789,362
COMBUSTION CARBURETOR
Filed June 12, 1920   2 Sheets-Sheet 1
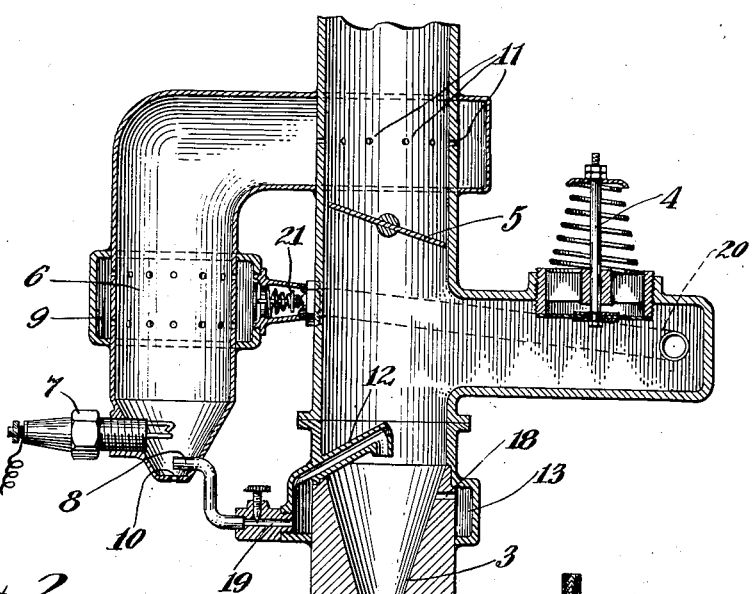
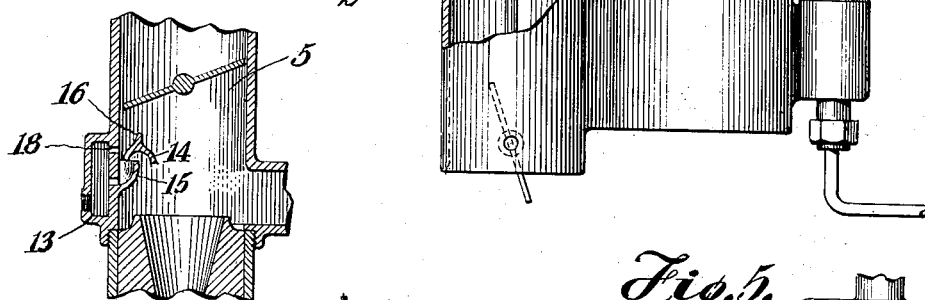
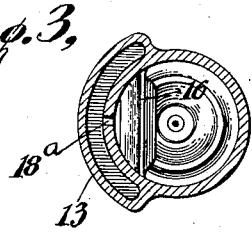
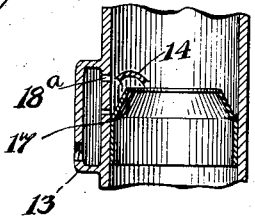
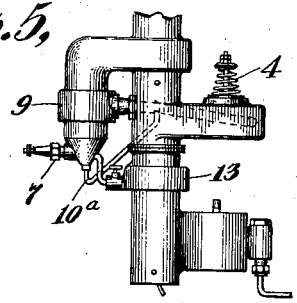

Jan. 20, 1931.  J. GOOD  1,789,362
COMBUSTION CARBURETOR
Filed June 12, 1920  2 Sheets-Sheet 2

Patented Jan. 20, 1931

1,789,362

UNITED STATES PATENT OFFICE

JOHN GOOD, OF GARDEN CITY, NEW YORK, ASSIGNOR TO GOOD INVENTIONS CO., OF NEW YORK, N. Y., A CORPORATION OF NEW YORK

COMBUSTION CARBURETOR

Application filed June 12, 1920. Serial No. 388,682.

The invention, consisting of method and apparatus, is an improvement on that class of charge-forming apparatus for internal combustion engines wherein the normal carburetor mechanism is combined with suction-operated burner mechanism for imparting heat to the engine fuel or mixture charge or to the intake passage, and its object is to simplify the relation of one mechanism to the other, particularly in respect to the manner of deriving the combustible mixture for the burner from the supply of fuel and air for the carburetor, so that the burner may be automatically and reliably ignitible and capable of steady or non-explosive combustion at variable combustion rates, and so that the said burner shall be capable of operation to impart heat to the carburetor mixture when the engine is being cranked over as well as when running on its own combustion, and may be combined in various different relations to the carburetor mechanism as may be required. The invention includes various features of operation and structure pertinent to the attainment of the results stated though not necessarily limited thereto as hereinafter set forth in the claims.

In the drawing, Fig. 1 represents an axial section of a form of charge-forming device or carburetor incorporating a suction burner according to this invention;

Fig. 2 is a modification of the liquid catching device;

Fig. 3 a cross-section of Fig. 2;

Fig. 4 still another form of liquid catching means,

Fig. 5 is a preferred modification of the apparatus,

Fig. 6 a development thereof, and

Figure 7:
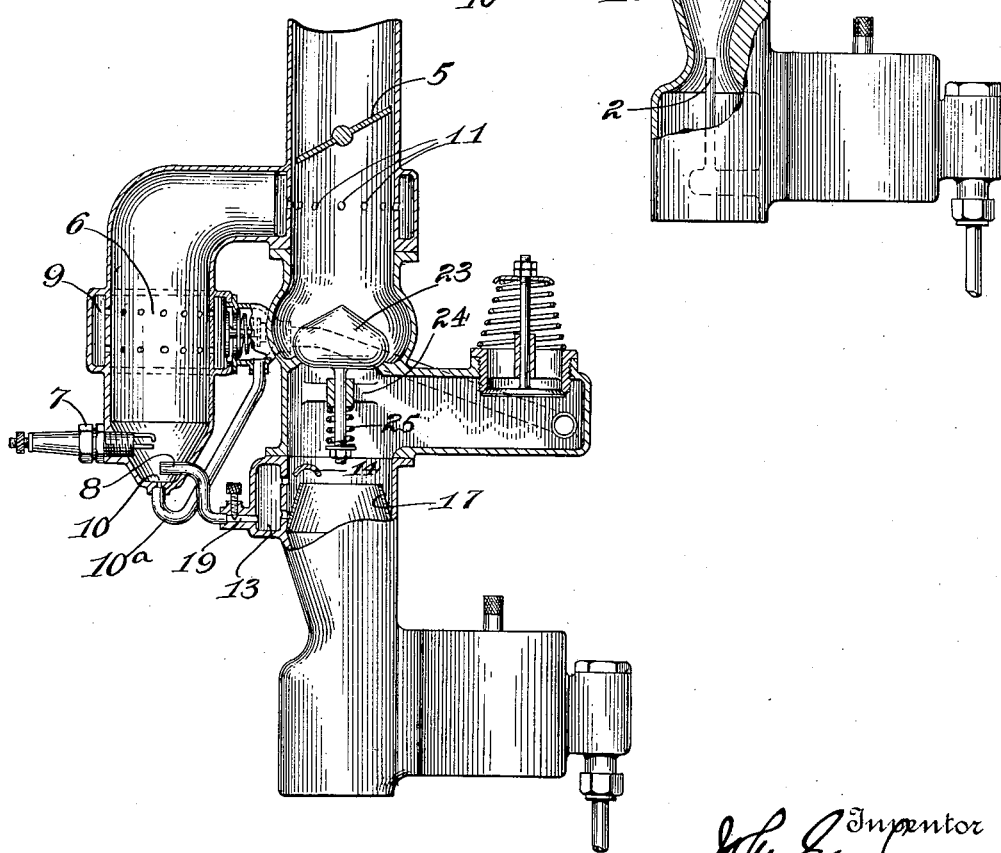

Fig. 7 a modification of Fig. 6.

The carburetor shown in Fig. 1 comprises a constant level or float chamber, supplying liquid fuel to a spray nozzle 2 by, or proportional to, the suction effect or air velocity in the venturi air entrance 3 which surrounds the latter. This primary air entrance is normally open but may be provided with the usual choker if desired as shown at 3ª in Fig. 1. Auxiliary air entering by the spring-seated valve 4 passes to the carburetor mixing space and joins the spray from the venturi to make a mixture therewith suitable for combustion in the engine to which it passes under the control of the throttle 5 as usual. This common form of carburetor mechanism is used in this figure as representing any means for measuring liquid fuel in proportion to an air flow for making suitable engine charge mixture and it will be evident to those skilled in this art that any usual or suitable means for maintaining accuracy of proportions of this mixture throughout the engine range or for making it initially rich in fuel or temporarily rich on quick opening of the throttle or for obtaining other well known carburetor results may also be incorporated.

The burner mechanism comprises an ignition and mixing space 6 containing a spark plug 7, a spray nozzle 8 for liquid fuel, and an air inlet chamber 9 adapted to let air into the mixing space round about its common axis It also has a very small air jet hole 10 open to atmosphere in this case, and placed in aspirating relation to the fuel nozzle, the general construction and mode of operation of this device being substantially the same as shown in my prior Patent No. 1,334,446, dated March 23, 1920. Flows of air and fuel into this burner are caused by the suction effect of the engine intake passage, transmitted through the series of holes 11 constituting the burner outlet, and the resulting mixture is ignited in the burner so that the flame or flame products enter the intake passage through these outlet holes, which latter are distributed round about said passage so as to cause a prompt mixture with the carburetted mixture flowing to the engine vaporizing the latter and preparing it for prompt ignition in the engine and thereby helping the engine start in cold weather as well as improving its operation when in normal use.

The flow of liquid fuel to the burner is derived from the liquid delivery or spray mixture which has already entered and been measured in the carburetor, and for this purpose the carburetor passage is provided with means for diverting a portion of such fuel, consisting in the case of Fig. 1 of a deflector member 12 mounted in the flow path of the carburetor mixture and adapted to catch some of the liquid fuel and direct it into a cup or burner fuel receptacle 13 shown as surrounding the intake passage in Figure 1. Liquid catching means for this purpose can obviously function in different ways and the shape and location thereof will naturally be designed according to circumstances. The deflector 12 is simply a spout opening toward the spray source and emptying into the cup. In Fig. 2 it is constituted of a transverse baffle 14 arranged to deflect liquid into the flange 15, from whence it flows to the cup 13. This catcher has an upstanding wing 16 located just below the lip of the throttle to catch the drip therefrom and from the walls of the intake after the engine has stopped and direct it into the cup. Fig. 4 shows another modification of the liquid catching means. Here a thimble 17 fitted inside the intake passage collects the liquid drip therein, after the engine has stopped, the baffle deflector 14 in this case being simply a deflector without the wing. In each of these forms the liquid fuel is caught and directed into the fuel cup and the level in the latter is or may be kept constant by the provisions for overflow to the carburetor. In Figs. 2 and 4 the holes 18 and 18ª are vents to allow air to enter the cup as fuel is withdrawn. Having thus separated out a portion of the liquid fuel in a receptacle, it is obvious that such fuel may be withdrawn for use in the burner, and for this purpose the fuel nozzle 8 is connected to the fuel cup through the adjustable fitting 19. The air supply for the burner is taken from the carburetor by means of the air tube 20 connecting the air space of the carburetor, preferably near the auxiliary valve 4, with the burner air chamber 9, and such air entry is controlled by the small air valve 21 which, having a seating spring serves to correlate the suction within the ignition and combustion space with the fuel spraying means thereof so as to keep substantially constant proportions in the fuel and air mixture formed therein. This control of the burner proportions is independent of variation of the suction effect transmitted through the burner outlet, and enables the burner to operate properly at varying combustion rates according to the suction effect. Such automatic control of the burner proportions may obviously also be secured in other ways with equivalent result. All the parts described may obviously be organized in the general structure with greater compactness than, for convenience, shown in the drawing. The spark plug is connected for operation from the engine distributor head (not shown) or to one of the engine spark plugs or otherwise, and the various passages are so arranged that when the engine is cranked, as by its starting motor, or is in normal action with the throttle closed or partly closed the intake suction thereby produced and transmitted simultaneously or in succession to the burner and carburetor, causes fuel and air to be drawn into both, and in such manner as to result in ignition in the burner so that the flame or its products will be immediately available for vaporizing the carburetted fuel as above stated. By locating the outlet 11 between the engine and the throttle as shown in the drawing, its combustion rate will diminish as the delivery of mixture from the carburetor increases, because of the diminishing suction as the throttle is opened, but the burner may of course be controlled as desired either manually or automatically. It is apparent that inasmuch as the burner proportions are positively controlled by the relative sizes and arrangement of its fuel and air passages and of the setting of valve spring 21, the burner is not only certain to ignite promptly but to give and maintain constant combustion proportions adapting it to burn steadily and clean under all conditions. It may be constructed or regulated to produce different effects, either to give complete combustion without much excess of air or fuel in its products, or to give a partial or restricted combustion resulting in a hot gaseous medium having combustible characteristics. In any case, the burner fuel and preferably also the burner air are derived from the carburetor, after measurement in the latter, and are thereafter controlled as to their combustible combination so that the desired burner action is always maintained free from unintended variation and both the burner and the carburetor may be adjusted without relation to the other so that both may function to the best advantage. The small amount of air used for the aspirating air jet 10, while shown as taken from atmosphere, may be taken from the carburetor, so that all the burner air is derived from the latter. A small pipe or passage 10ª connecting the said jet with the air tube 20 will serve this purpose as shown in Fig. 5, but obviously this connection can be effected in a variety of ways. The fuel cup will ordinarily retain a sufficient quantity of fuel to supply the burner on starting the engine and it is an added and useful function of the drip catcher, such as 17 that some of the liquid fuel remaining therein when the engine is stopped, may be swept up with the carburetor mixture when the engine is again started in rotation, thereby providing an initially rich effect tending to help the engine start in action, the function of the catcher in this respect being quite independent of its function of supplying fuel for the burner.

Figure 6 illustrates a desirable arrangement when it is required to have the burner in action throughout the entire range of action of the carburetor. In this form the burner outlet 11 is located at the throat of a Venturi tube constituting part of the intake passage, such tube being shown in the present case as on the engine side of the throttle but capable of location elsewhere with the same effect. The flow of the carburetor mixture through the tube subjects the burner outlet 11 to a lower pressure than exists at its entrance so as to maintain a flow through the burner sufficient to keep it in action even though there may be no pressure difference resulting from the setting of the throttle 5. By appropriate design of the Venturi tube the burner may be thus kept in action throughout the whole or any part of the carburetor range.

Figure 7 illustrates another means of maintaining at all times a difference of pressure between the entrance and outlet of the burner so as to keep it in action. In this case a check valve 23 mounted in a spider support 24 intervenes between the carburetor mixing space and the burner outlet 11. If this valve be arranged to seat by gravity it will maintain a substantially constant pressure difference between the entrance and outlet of the burner which will keep the burner in action at a constant rate of combustion for as long as the carburetor is in action. The said valve is shown herein as seated by a spring 25, in which case the pressure difference increases as the carburetor action increases and the burner in consequence functions at an increasing rate. In this form the burner outlet is located between the throttle and the carburetor, but it will be apparent that it can be located elsewhere according to the effect desired.

The use of a liquid-catching baffle member which extends crosswise of the carburetor spray passage, like the deflector 16, affords an advantage over the hole or spout type of deflector of Fig. 1, in that it intercepts the spray at points near its center as well as near its edge, that is to say, at several points, where the density of the spray may be different and therefore the rate of liquid diversion is kept more closely in accord with the average density of the spray and hence more directly proportional to the spray delivery as a whole.

Claims:

1. The method of producing heated fuel mixture for an internal combustion engine which consists in causing the intake suction to produce flows of air and liquid fuel to form an engine-operating mixture, diverting constant relative portions of both said flows to an ignition and mixing space, maintaining said diverted flows in a predetermined proportion adapted to produce non-explosive and clean-burning combustion in said space, combustibly combining said diverted flows and admitting the combustion products to the said engine operating mixture.

2. A charge-forming device for internal combustion engines comprising a suction intake passage, a suction fuel orifice delivering liquid fuel to said passage in proportion to the air flow therethrough, means for catching and diverting a part of such fuel delivery, a burner having a suction air jet for spraying such liquid and having an igniter intercepting such spray and an outlet delivering the combustion products directly into said intake passage.

3. In an internal combustion engine, an upwardly extending intake passage including a carburetor connected to its lower end, and means above the carburetor in said passage for collecting drip of liquid fuel when the engine is stopped, said means being associated with the air flow through the intake above the carburetor so that its collected fuel will be carried thereby into the engine when again started.

4. In an internal combustion engine, the combination of a charge-forming device included in the engine intake passage, of means for receiving liquid fuel flowing down the walls of said passage when the engine is stopped, and a combustion device supplied with fuel by said means and adapted to heat the mixture produced by said charge-forming device.

In testimony whereof, I have signed this specification.

JOHN GOOD.